United States Patent
Kuefer et al.

(10) Patent No.: US 10,621,190 B2
(45) Date of Patent: Apr. 14, 2020

(54) SEARCH USING DRAG AND DROP OF ASSETS INTO A SEARCH BAR

(71) Applicant: Adobe Inc., San Jose, CA (US)

(72) Inventors: Andreas Kuefer, Sausalito, CA (US); Cosmin Daniel Capitanu, Bucharest (RO)

(73) Assignee: Adobe Inc., San Jose, CA (US)

( * ) Notice: Subject to any disclaimer, the term of this patent is extended or adjusted under 35 U.S.C. 154(b) by 386 days.

(21) Appl. No.: 14/943,895

(22) Filed: Nov. 17, 2015

(65) Prior Publication Data

US 2017/0140011 A1    May 18, 2017

(51) Int. Cl.

| | | |
|---|---|---|
| *G06F 3/0484* | (2013.01) | |
| *G06F 16/248* | (2019.01) | |
| *G06F 3/0482* | (2013.01) | |
| *G06F 16/25* | (2019.01) | |
| *G06F 16/9535* | (2019.01) | |
| *G06F 16/2457* | (2019.01) | |
| *G06F 16/48* | (2019.01) | |
| *G06F 16/9038* | (2019.01) | |
| *G06F 16/43* | (2019.01) | |
| *G06F 16/907* | (2019.01) | |
| *G06F 3/0486* | (2013.01) | |

(52) U.S. Cl.
CPC .......... *G06F 16/248* (2019.01); *G06F 3/0482* (2013.01); *G06F 3/0486* (2013.01); *G06F 3/04842* (2013.01); *G06F 16/24575* (2019.01); *G06F 16/252* (2019.01); *G06F 16/43* (2019.01); *G06F 16/48* (2019.01); *G06F 16/907* (2019.01); *G06F 16/9038* (2019.01); *G06F 16/9535* (2019.01)

(58) Field of Classification Search
CPC .. G06F 17/30554; G06F 16/248; G06F 16/25; G06F 16/9535; G06F 16/2457; G06F 16/48; G06F 16/9038; G06F 16/43; G06F 16/907; G06F 3/0482
See application file for complete search history.

(56) References Cited

U.S. PATENT DOCUMENTS

| | | | | |
|---|---|---|---|---|
| 6,182,069 B1 * | 1/2001 | Niblack | .............. | G06F 17/3025 |
| 7,797,635 B1 * | 9/2010 | Denise | ................ | G06F 16/9038 |
| | | | | 715/738 |
| 8,447,752 B2 * | 5/2013 | Wang | ................ | G06F 17/30277 |
| | | | | 382/175 |
| 2001/0013004 A1 * | 8/2001 | Haris | ..................... | G06Q 10/06 |
| | | | | 705/301 |
| 2002/0169768 A1 * | 11/2002 | Lowe | ................... | G06F 17/3064 |
| 2010/0205202 A1 * | 8/2010 | Yang | ................. | G06F 17/30277 |
| | | | | 707/767 |
| 2011/0035403 A1 * | 2/2011 | Ismalon | .............. | G06F 16/9535 |
| | | | | 707/769 |
| 2011/0179021 A1 * | 7/2011 | Wen | ................... | G06F 17/30256 |
| | | | | 707/723 |

(Continued)

*Primary Examiner* — Cam Y T Truong
(74) *Attorney, Agent, or Firm* — SBMC

(57) ABSTRACT

Various implementations enable a similarity search to be conducted for assets based upon one or more assets being dragged from a viewing area and dropped into a search field. Search results are returned in the form of assets and textual representations that define search parameters. The textual representations can be easily modified to change the search parameters and, hence, the displayed search results.

20 Claims, 9 Drawing Sheets

(56) References Cited

U.S. PATENT DOCUMENTS

| | | | | |
|---|---|---|---|---|
| 2011/0202543 A1* | 8/2011 | Chin | ............... | G06F 17/30247 |
| | | | | 707/749 |
| 2012/0072410 A1* | 3/2012 | Wang | ............... | G06F 17/30268 |
| | | | | 707/711 |
| 2012/0278316 A1* | 11/2012 | Reznik | ............... | G06F 16/951 |
| | | | | 707/723 |
| 2013/0036109 A1* | 2/2013 | Kulick | ............... | G06Q 10/10 |
| | | | | 707/722 |
| 2013/0332438 A1* | 12/2013 | Li | ............... | G06F 16/9535 |
| | | | | 707/706 |
| 2015/0347464 A1* | 12/2015 | Takata | ............... | H01L 29/7835 |
| | | | | 707/728 |
| 2017/0075536 A1* | 3/2017 | Cho | ............... | G06F 17/30867 |

* cited by examiner

SEARCH USING DRAG AND DROP OF ASSETS INTO A SEARCH BAR

BACKGROUND

Searching for content in a digital environment can be a time-consuming task. This task can be even more complicated based upon the type of search conducted. For example, if a user has an image and they wish to search for and see similar images, they are often required to go through a complicated workflow that can include multiple manual steps such as navigating a menu structure to access search functionality, entering search terms and parameters, reviewing search results, and, if the search is not successful, repeating the same or different manual steps. This can be inefficient and can lead to an undesirable user experience. Accordingly, those who develop search technologies continue to face challenges to streamline the user search experience and provide more efficient and convenient methods for conducting searches.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, a digital medium environment is described that includes a computing device having a content searching application that includes a user interface to enable content searching to be conducted. In this digital medium environment, a content searching method is described. The user interface of the content searching application receives selection of an asset having content such as video, images, text and the like. The content searching application ascertains that the asset has been dropped into a search field and, responsively, conducts a similarity search associated with the asset based upon metadata associated with the asset. The content searching application then displays search results in the form of additional assets, as well as textual representations that define search parameters used for the similarity search. The textual representations enable a user to modify the search results. For example, the user can delete one or more of the textual representations to cause a supplemental search to be conducted or pare down the search results by removing assets that share metadata with the deleted textual representation. The user can also add additional textual representations to cause a supplemental search to be conducted.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
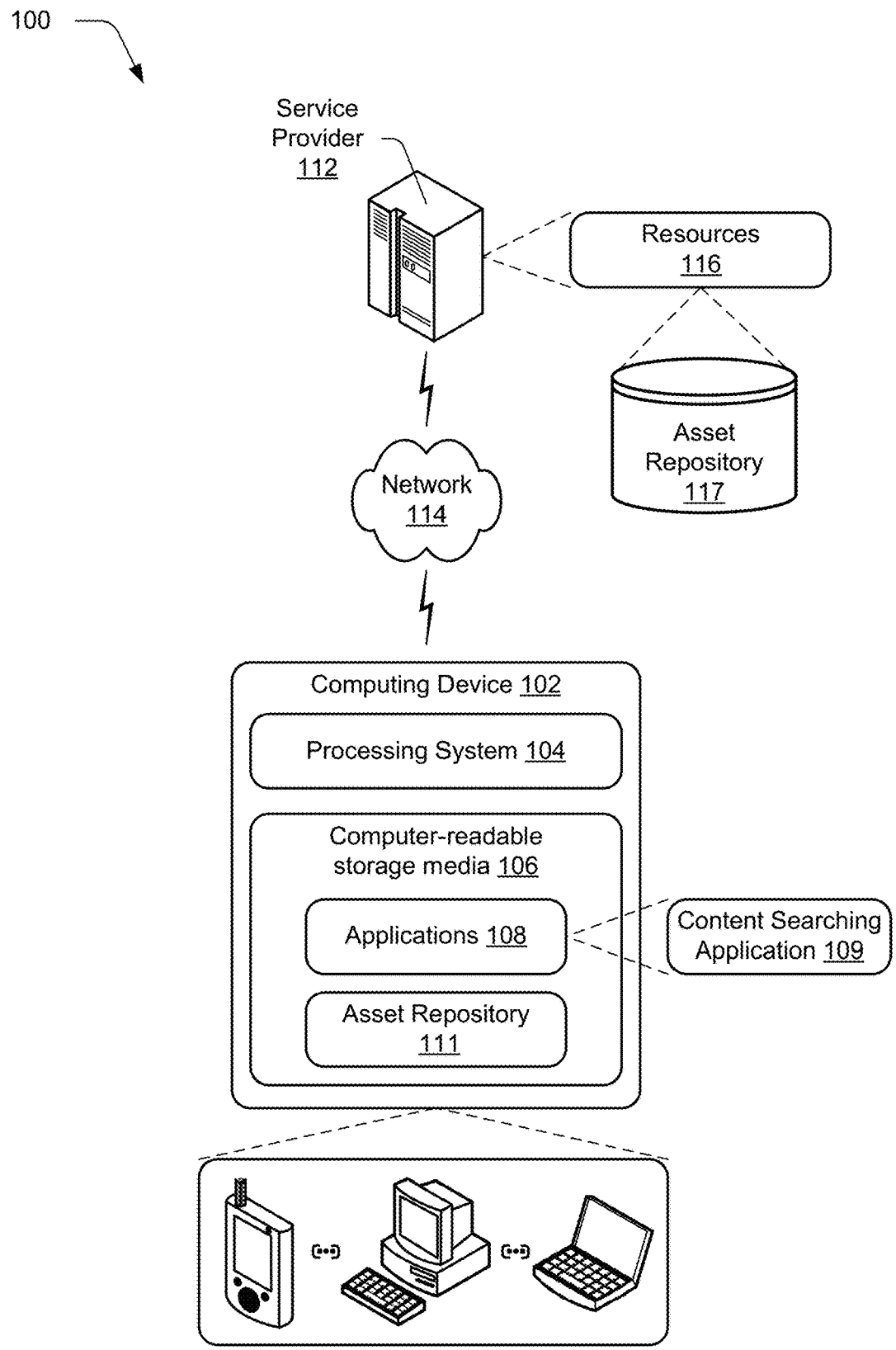
FIG. 1 is an illustration of a digital medium environment in an example implementation that is operable to employ techniques described herein.

Content searching techniques are described that can greatly reduce the number of actions that a user has to perform in order to conduct a search, such as a similarity search, or to modify returned search results. A similarity search is a search that uses one or more assets as a basis to find other assets that are similar, in some respect, to the assets used as the basis of the search. As used herein, an "asset" pertains to a visually displayable content item that can include one or more of video, images or text. Oftentimes assets will have a geometry such as a square or rectangle, and will include within the geometry, an image and some type of descriptive text. For a video, the image may be a thumbnail that visually encapsulates the video.

In one or more implementations, a digital medium environment is described that includes a computing device having a content searching application that includes a user interface to enable content searching to be conducted. In this digital medium environment, the user interface of the content searching application receives selection of an asset having content such as video, images, text and the like. The content searching application ascertains that the asset has been dropped into a search field and, responsively, conducts a similarity search associated with the asset based upon metadata associated with the asset. The content searching application then displays search results in the form of additional assets, as well as textual representations that define search parameters used for the similarity search. The textual representations enable a user to modify the search results. For example, the user can delete one or more of the textual representations to cause a supplemental search to be conducted or to pare down the search results by removing assets that share metadata with the deleted textual representation. The user can also add additional textual representations to cause a supplemental search to be conducted.

For example, assume that a user has opened their content searching application and is viewing multiple different assets. One asset may be associated with family photographs while another may be associated with beach scenes. Each asset has metadata that describes characteristics and properties of the asset. So, for example, the family photograph asset may have metadata including "mom", "dad", "Smith family reunion", and the like. Similarly, the beach scenes asset may have metadata including "Pacific Coast", "Atlantic Coast", "Cape Cod", and the like. The user may select the beach scenes asset and drag and drop it into a search field of the content searching application. When this occurs, the content searching application automatically processes the metadata associated with that asset and formulates keywords for a similarity search. The content searching application then performs the similarity search and returns assets having metadata associated with the keywords as by being the same as or similar to the keywords. In this manner, a user need only perform a simple single action, e.g., a drag and drop action, to cause the similarity search to be conducted. This relieves the user of having to navigate through a complicated workflow including navigating a menu structure, typing in search terms and the like. Furthermore, in some implementations textual representations that define search parameters for the search are displayed and may be manipulated by the user to cause a supplemental search to be performed, or to modify the search results. For example, by deleting one or more of the textual representations, the returned search results can be pared down by removing assets that share metadata with the deleted textual representation. The user may also add additional textual representations to further modify the search results.

In this manner, the user search experience is greatly improved by reducing the number of actions the user has to perform to conduct a search. The user is relieved of having to navigate what can sometimes be a complicated menu structure in order to perform a similarity search, which is particularly helpful in the context of small form factor devices. Furthermore, search results can be easily manipulated to more quickly arrive at a desired result set. The implementations described below provide an intuitive and easy-to-understand process for conducting searches.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some implementations, applications 108 may include a content searching application 109. The content searching application 109 is configured to enable users to conduct content searches for content that may be stored locally in an asset repository 111, remotely in a remote asset repository 117, or both. As noted above, an "asset" pertains to a visually displayable content item that can include one or more of video, images or text. One example of a content searching application is a web browser which is operable to access various kinds of web-based resources (e.g., content and services). The applications 108 may also represent a client-side component having integrated functionality operable to access web-based resources (e.g., a network-enabled application), browse the Internet, interact with online providers, and so forth. Applications 108 may further include an operating system for the computing device and other device applications. The content searching applications can include applications other than web browsers without departing from the spirit and scope of the claimed subject matter.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 9.

The digital medium environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. The resources can include one or more assets that are available from an asset repository 117. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of assets, video comprising part of an asset, ads, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of a content searching application in accordance with one or more implementations.

Content Searching Application

Figure 2:
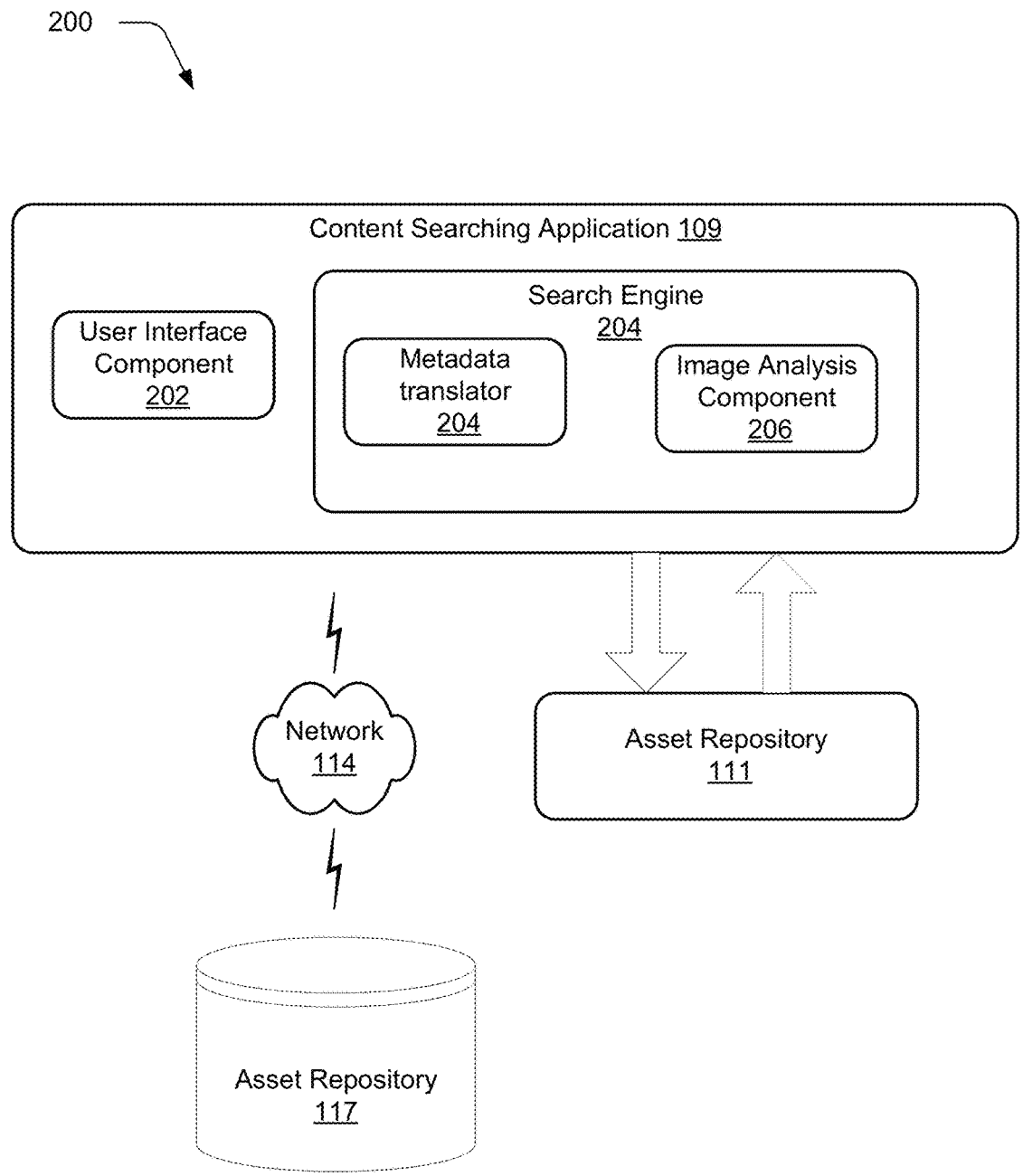
FIG. 2 illustrates an example content searching application in accordance with one or more implementations.

FIG. 2 illustrates a system 200 that shows content searching application 109 in more detail in accordance with one or more implementations. The content searching application includes, in this example, a user interface component 202 and a search engine 204. While the search engine is shown as being included as part of the content searching application 109, the search engine can be implemented separately from the content searching application 109 and used to conduct searches in the manner described below. The search engine includes, in this example, a metadata translator 204 and an image analysis component 206.

The user interface component 202 is representative of functionality that provides a suitably-configured user interface to enable a user to interact with and search for assets as described above and below. Interaction by way of the user interface can take place in any suitable way including, by way of example and not limitation, through input devices, touch input, gesture input, and the like. Example user interfaces are described below in more detail in a section entitled "Example User Interface Experience."

The search engine 204 is representative of functionality that enables searches to be conducted, including similarity searches, as described below in more detail. The metadata translator 204 translates metadata associated with one or more assets selected by a user and formulates keywords for searching. The keywords are then used to perform the similarity search and return assets having metadata associated with the keywords as by being the same as or similar to the keywords. The metadata can include any suitable type of metadata associated with an asset. Typically, metadata is "data about data" and can reside in any suitable form. For example, the metadata can describe properties and characteristics of the asset. Such can include, by way of example and not limitation, descriptive metadata that can be used for discovery and identification such as objects appearing in an asset (people, kids, animals), asset subject (recreation, running, athletics), asset setting (home, work), keywords, and the like.

The image analysis component 206 is representative of functionality that enables image analysis to be conducted on one or more assets in a particular repository, such as a local asset repository 111, or a remote asset repository 117 accessible by way of a network 114. The image analysis can be conducted prior to a search being initiated or contemporaneously with a search being initiated. For example, a user may have a number of assets in a local repository. The image analysis component 206 can perform image processing and analysis on those assets to pre-index the assets before any search is conducted. Alternately or additionally, when one or more assets are selected by a user to be the subject of search, the image analysis component 206 can conduct image analysis on the asset or assets contemporaneously with the search. The image analysis process develops metadata that describes the characteristics and properties of the assets. When a search is conducted, these characteristics and properties can be utilized to search for other assets that have similar characteristics and properties. The image analysis component can use any suitable type of image analysis techniques. Such techniques can include, by way of example and not limitation, object recognition, people recognition, facial identification, image segmentation, and the like.

When a search is conducted by the search engine 204, similar assets can be returned from one or more repositories and displayed to a user by way of the user interface component 202, as will be described below in more detail.

Having discussed an example content searching application 109, consider now an example user interface that provides a user interface experience in connection with a similarity search.

Example User Interface Experience

Figure 3:
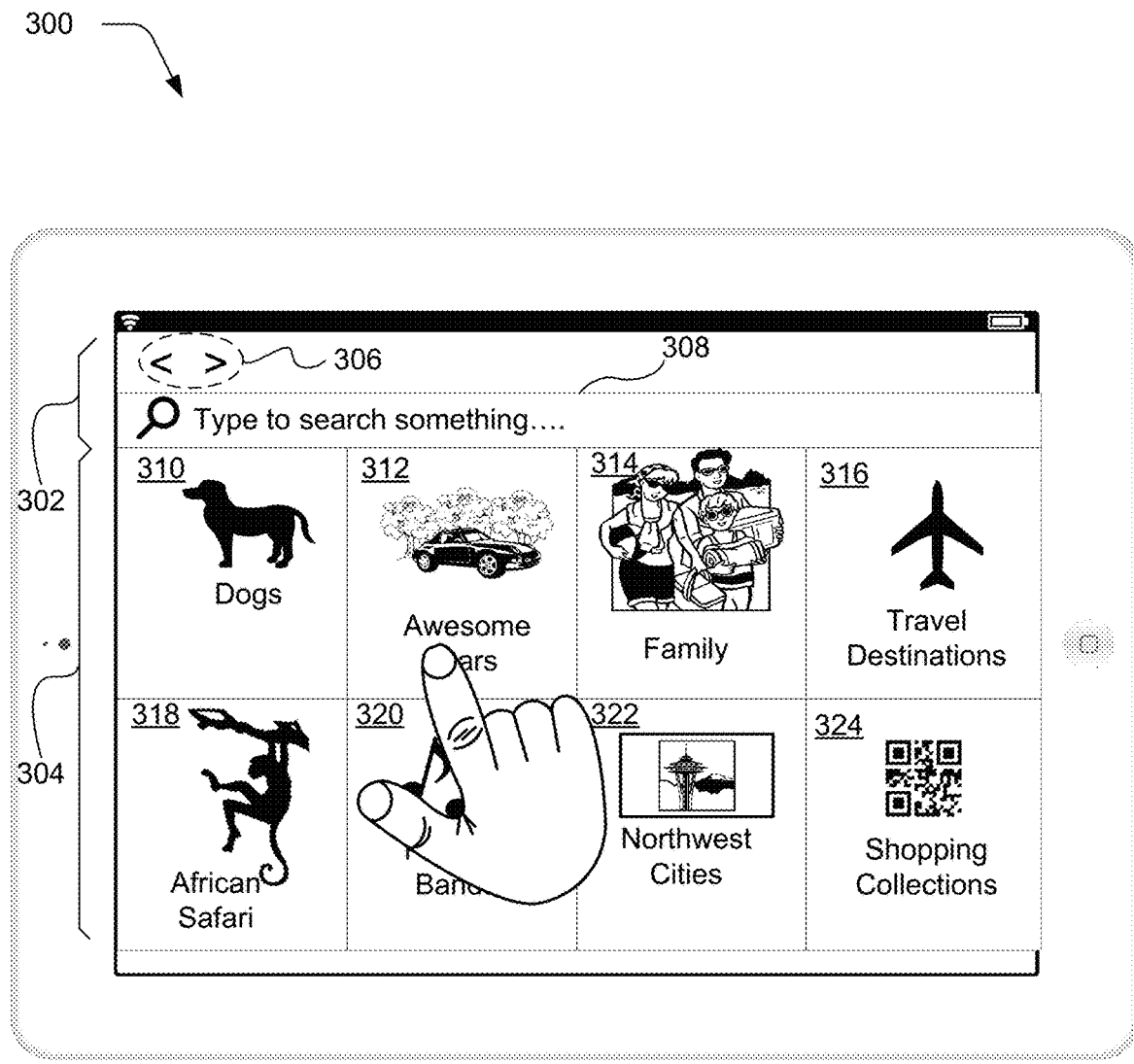
FIG. 3 illustrates an example device displaying multiple assets that can form the basis of a similarity search in accordance with one or more implementations.

FIG. 3 illustrates an example device 300 that includes a display area within which content is displayed. In this particular example, the display area includes a controls area 302 and a content display area 304.

In the illustrated and described example, the controls area 302 displays controls typically associated with an application in the form of a content browser, such as a web browser. Specifically, the controls area includes forward and backward navigation instrumentalities 306 and a search field 308 in the form of a search box within which text can be entered and other content can be provided.

The content display area 304 includes a number of assets 310, 312, 314, 316, 318, 320, 322, and 324. In this example, a user has touch-selected asset 312, intending to use it as the subject of a similarity search.

Figure 4:
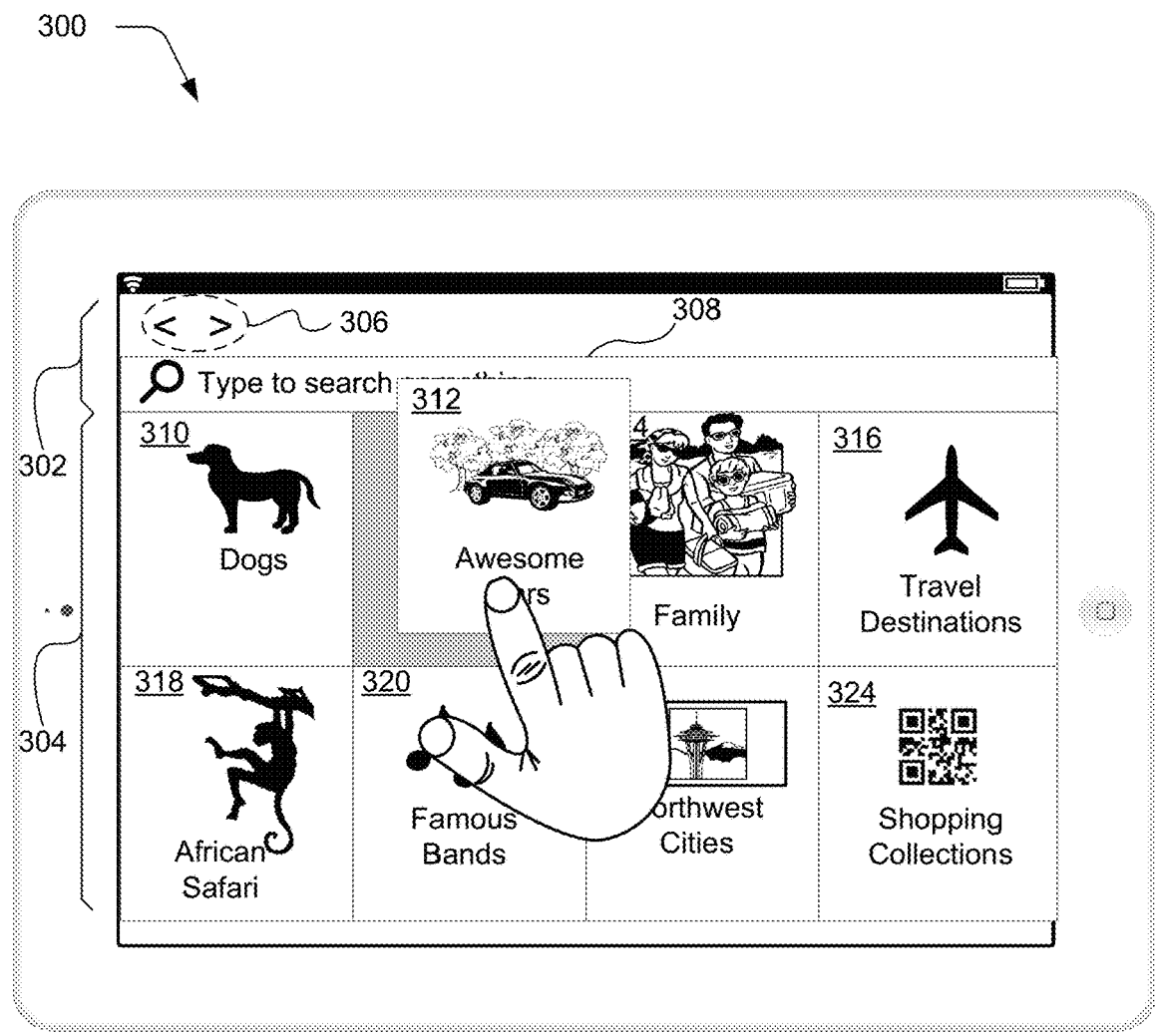
FIG. 4 illustrates the FIG. 3 device being used to conduct a similarity search in accordance with one or more implementations.
Figure 5:
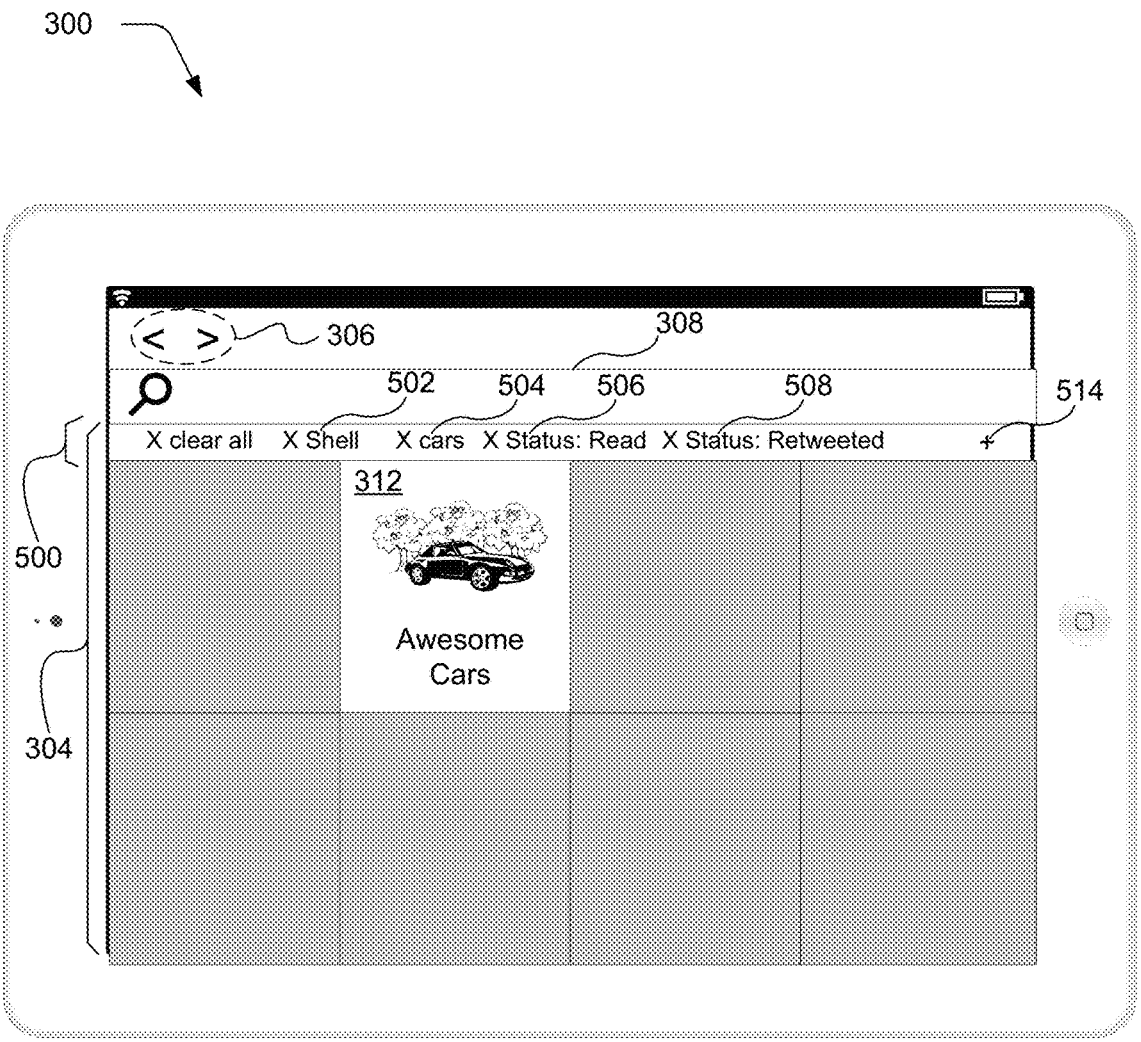
FIG. 5 illustrates the FIG. 3 device being used to conduct a similarity search in accordance with one or more implementations.

FIG. 4 illustrates asset 312 being dragged into the search field 308 so that it can be dropped or otherwise deposited into the search field. In this example, a small portion of the top of asset 312 overlaps with the search field 308. When the asset is deposited or dropped into the search field 308, as by the user lifting their finger, the metadata associated with the asset is automatically used to conduct a similarity search as mentioned above. That is, the metadata is used to formulate keywords that are then used for a similarity search. So, for example, the metadata might include "cars", "race cars", "Corvette" and the like. This metadata can then be used as keywords for a similarity search. In addition, to facilitate the efficiency of a particular search and to enable a user to dynamically direct or redirect a search, the metadata can be exposed to the user as textual representations in the form of tags, to enable the user to manipulate the metadata to dynamically modify the search results. Textual representations, other than tags, can be utilized without departing from the spirit and scope of the claimed subject matter. Consider now FIG. 5 which utilizes like numerals from FIGS. 3 and 4 to depict like elements.

There, the content display area 304 includes a tag bar 500. The tag bar includes a plurality of tags derived from the metadata of assets selected by the user. In this particular example there are four tags 502, 504, 506, and 508 and a "clear all" selection to clear the tags.

Each of the tags includes a user interface instrumentality that can be selected by a user to delete the tag. In this particular example, the user instrumentality resides in the form of an "X". If the user selects a tag's "X", that particular tag is deleted and the search results can be modified to remove any assets that might have that particular tag and replace the assets with new assets in one or more of the grayed-out locations around asset 312. Likewise, the tag bar 500 includes a user instrumentality 514 that allows a user to add a tag. So, for any particular similarity search, if the user wishes to modify the search, the user can select instrumentality 514 and provide one or more additional tags that are used to update the search results. Being able to both delete individual tags and add additional tags provides a powerful search mechanism for the user.

In this manner, a user can easily conduct a search by simply dragging and dropping an asset into search field 308. Moreover, by using a tag bar such as tag bar 500, the user can quickly and efficiently dynamically modify the parameters of the search. They can do this by quickly removing one or more tags, by adding tags to redirect the search or both. The above description constitutes but one way in which a user can modify the parameters associated with conducting a similarity search. Other modification techniques can be used. As an example, consider the following.

When assets that are a result of a similarity search are displayed in the content display area 304, a user can modify the parameters associated with the search and cause a supplemental search to be performed by dragging an asset out of the content display area 304. For example, a user may conduct a simple touch and swipe gesture to sweep the asset out of the content display area 304. When the asset is swept out of the content display area 304, the search engine can analyze the metadata associated with that particular asset and can conduct a new or supplemental similarity search to return a new or updated set of assets to be displayed in the grayed-out locations. So, for example, if an asset is removed from the content display area, the search engine may ascertain that the primary difference between the removed asset and the assets that remain is that the removed asset included the metadata "beach." From this, the search engine may make a decision that the user wishes to remove any assets that include the metadata "beach." Accordingly, those assets could be removed and a supplemental search could be conducted based on the remaining tags. Similarly, if the user quickly removes a plurality of assets, the search engine can analyze each of the removed assets to ascertain similarities between the associated metadata. Based on the similarities in metadata, the search engine can ascertain that assets that share similar metadata are not of interest to the user in this particular search. Therefore, those remaining assets that share similar metadata can be removed and an updated or supplemental search can be conducted. In this manner, the user can, in a sense, train their search. In effect, this approach constitutes what can be considered as a "subtractive" approach in which assets are removed to further modify the search.

As another example of how a user can modify their search, consider the following. When the user is presented with search results in the content display area 304, the user can further refine their search by dragging one or more of the returned assets into the search field 308. When this occurs, the metadata associated with these newly dragged assets can be used to conduct an updated or supplemental search. By virtue of being dragged into the search field 308, an assumption is made that the user considers these assets to be closer in substance to the user's desired search results. Accordingly, the metadata associated with these newly-dragged assets can be weighted more heavily or processed in a manner in which updated assets are returned that more closely track with the metadata associated with the newly-dragged assets. In effect, this approach can be considered as an "additive" approach in which previously-returned assets are added to the search field 308 to further bolster or strengthen the search results returned for the particular search.

In at least some implementations, and particularly those that use gesture-based operations, a user is able to not only quickly and efficiently conduct an initial search, but the user can modify their search in a robust and text free manner.

Furthermore, in at least some implementations, the subtractive and additive approaches described above can be used either with or without the tags that appear in tag bar 500. In subtractive and additive approaches that do not use the tag bar, search modification occurs in a purely visual, text-free manner based simply upon the content that is visually ascertained by the user in each asset.

Having considered various search implementations, consider now some example procedures that can be utilized.

Example Procedures

This section describes example procedures for conducting searches in accordance with various implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a content searching application 109, such as that described above.

Figure 6:
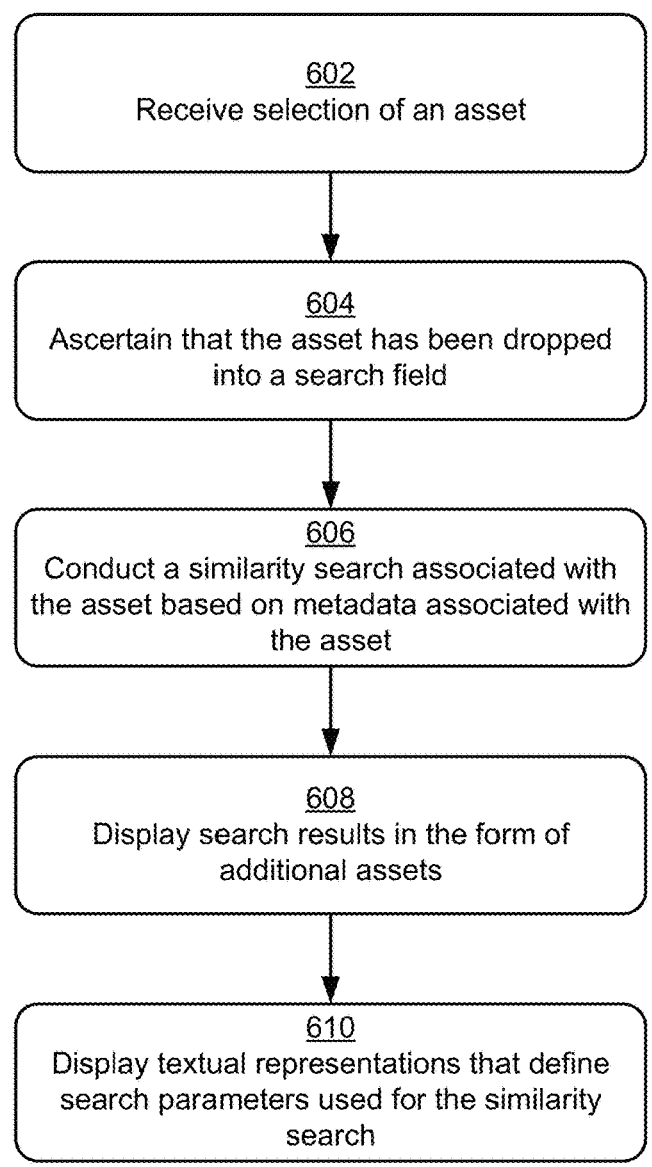
FIG. 6 is a flow diagram depicting an example procedure in accordance with one or more implementations.

FIG. 6 depicts an example procedure 600 in which a similarity search can be conducted to return search results that include assets that are similar, in some manner, to one or more assets selected by a user. A selection of an asset is received (block 602). Selection can occur in any suitable way, examples of which are provided above. The assets is ascertained to have been dropped into a search field (block 604). Responsive to being dropped into the search field, a similarity search associated with the asset is conducted based upon metadata associated with the asset (block 606). In some implementations, this can be done by using the metadata to formulate keywords and then using the keywords to compare with metadata of other assets. Assets that have metadata that is associated with the keywords as by being the same as or similar to the keywords can be included in a search results set. Search results are then displayed in the form of additional assets (block 608). Textual representations that define search parameters used for the similarity search are displayed (block 610). Examples of textual representations, such as tags, are provided above. Tags constitute but one form of textual representations. As such, other textual representations can be utilized without departing from the spirit and scope of the claimed subject matter. The textual representations can not only provide information to inform the user of the basis of the search, but in some implementations can be used to modify the search as described above and below.

Figure 7:
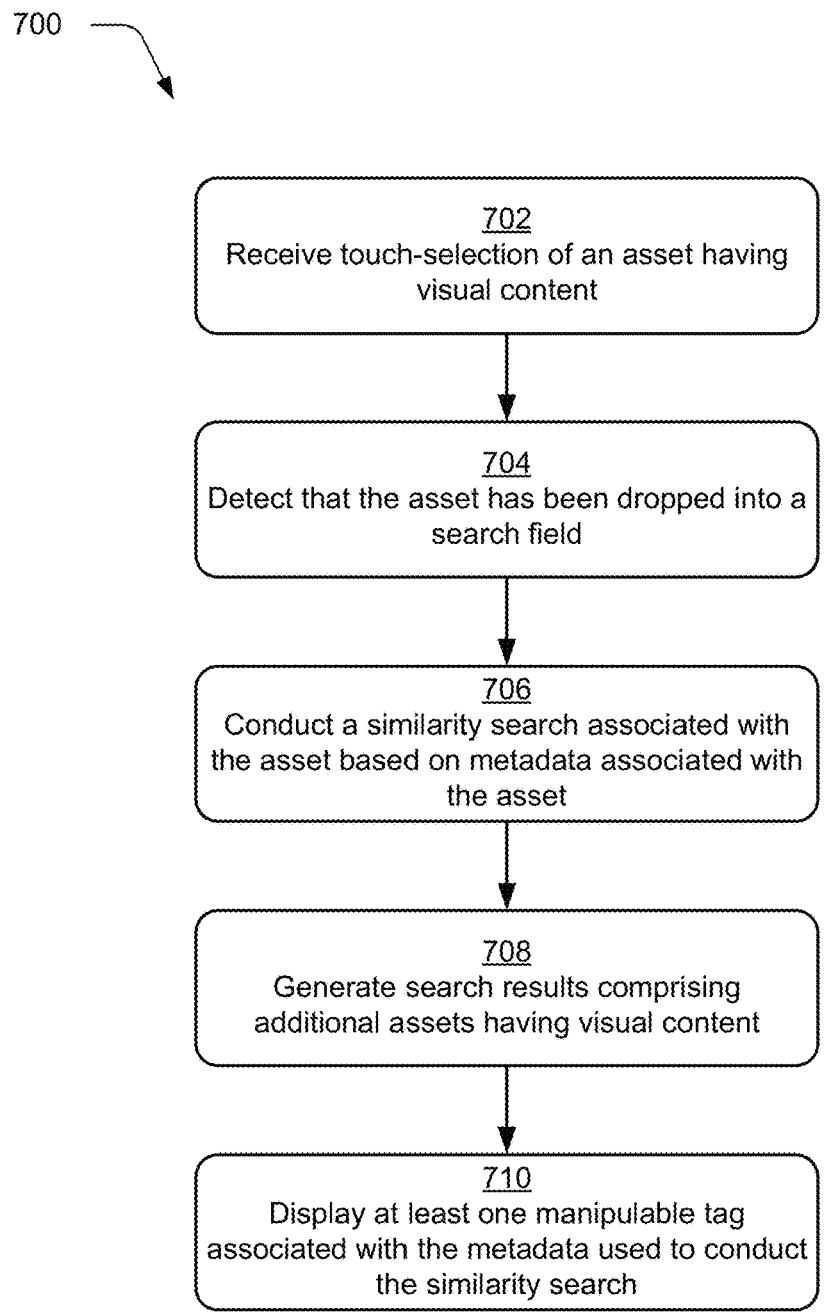
FIG. 7 is another flow diagram depicting an example procedure in accordance with one or more implementations.

FIG. 7 depicts an example procedure 700 in which a similarity search can be conducted to return search results that include assets that are similar, in some manner, to one or more assets selected by a user. Tags are displayed along with the search results to enable manipulation of the similarity search. A touch-selection of an asset having visual content is received (block 702). Selection can occur in any suitable way, examples of which are provided above. The visual content can include, in some implementations, an image or images. The asset is detected to have been dropped into a search field (block 704). Responsive to being dropped into the search field, a similarity search associated with the asset is conducted based upon metadata associated with the one or more assets (block 706). In some implementations, this can be done by using the metadata to formulate at least one keyword and then using the keyword to compare with metadata of other assets. Assets that have metadata that is associated with the keywords as by being the same as or similar to the keywords can be included in a search results set. Search results are generated and comprise additional assets having visual content (block 708). The generated search results can then be displayed. At least one manipulable tag associated with metadata used to conduct the similarity search is displayed (block 710). The manipulable tag can enable a user to dynamically modify search parameters and, hence, the search results. For example, to cause a supplemental search to be conducted, a user can delete one or more tags as described above. Similarly, the user can add one or more tags to cause a supplemental search to be conducted.

Figure 8:
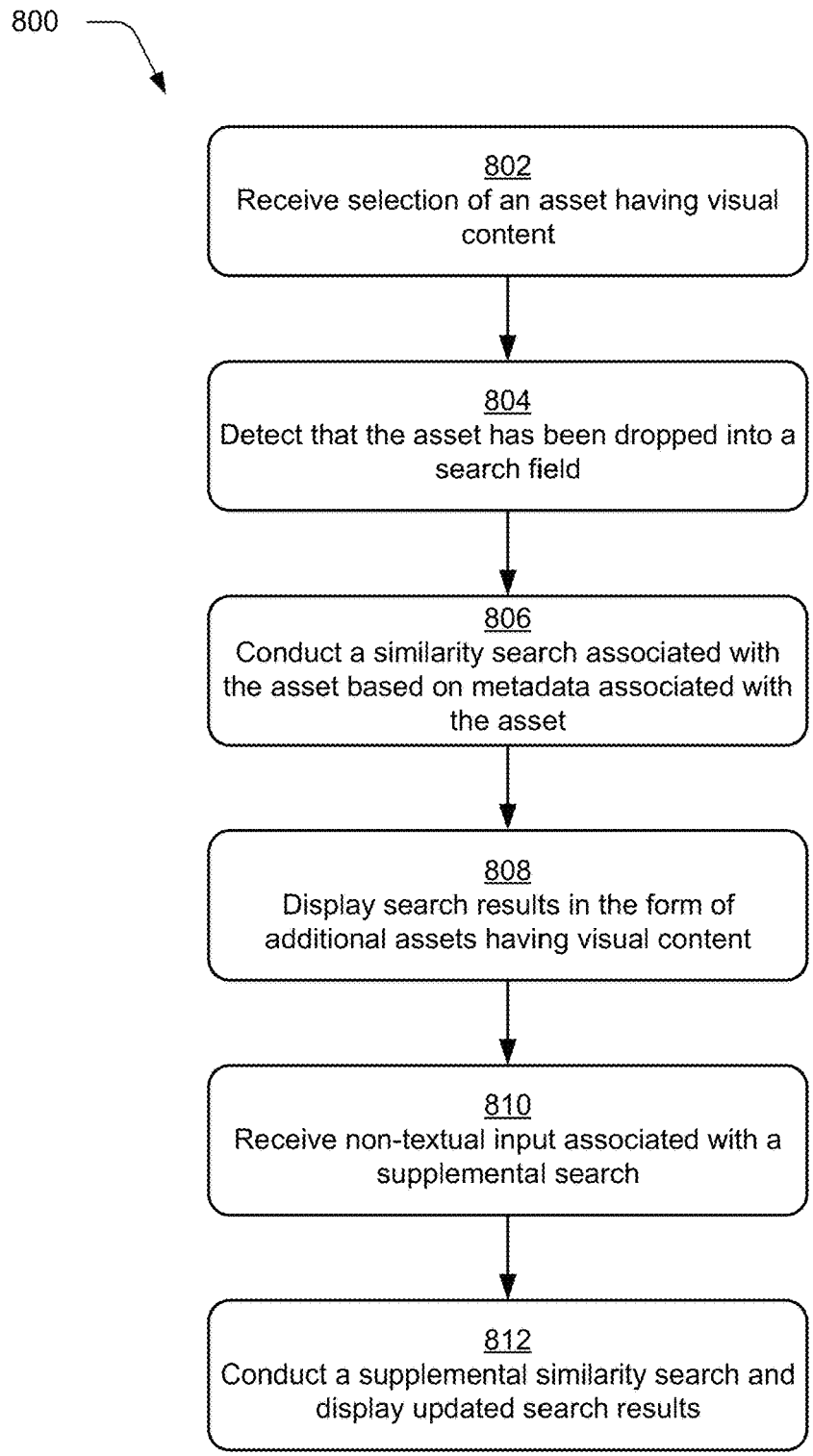
FIG. 8 is another flow diagram depicting an example procedure in accordance with one or more implementations.

FIG. 8 depicts an example procedure 800 in which a similarity search can be conducted to return search results that include assets that are similar, in some manner, to one or more assets selected by a user. Non-textual input can be received to further cause an additional supplemental search. A selection of an asset having visual content is received (block 802). Selection can occur in any suitable way, examples of which are provided above. The visual content can include, in some implementations, an image or images. The asset is detected to have been dropped into a search field (block 804). Responsive to detecting that the asset has been dropped into the search field, a similarity search associated with the asset is conducted based upon metadata associated with the asset (block 806). This can be done by using the metadata to formulate at least one keyword to conduct the similarity search to search for assets that have metadata that is associated with the keyword as by being the same as or similar to the keyword. Search results comprising additional assets having visual content are then displayed (block 808). Non-textual input associated with a supplemental similarity search is received (block 810). Any suitable non-textual input can be received. For example, the non-textual input can include gestural input that removes one or more assets. Alternately or additionally, the non-textual input can include gestural input that drags and drops a search result asset into the search field to further refine the similarity search. Responsive to receiving the non-textual input, a supplemental similarity search is conducted and updated search results are displayed (block 812).

Having described example procedures in accordance with one or more implementations, consider now an example system and device that can be utilized to implement the various techniques described herein.

Example System and Device

Figure 9:
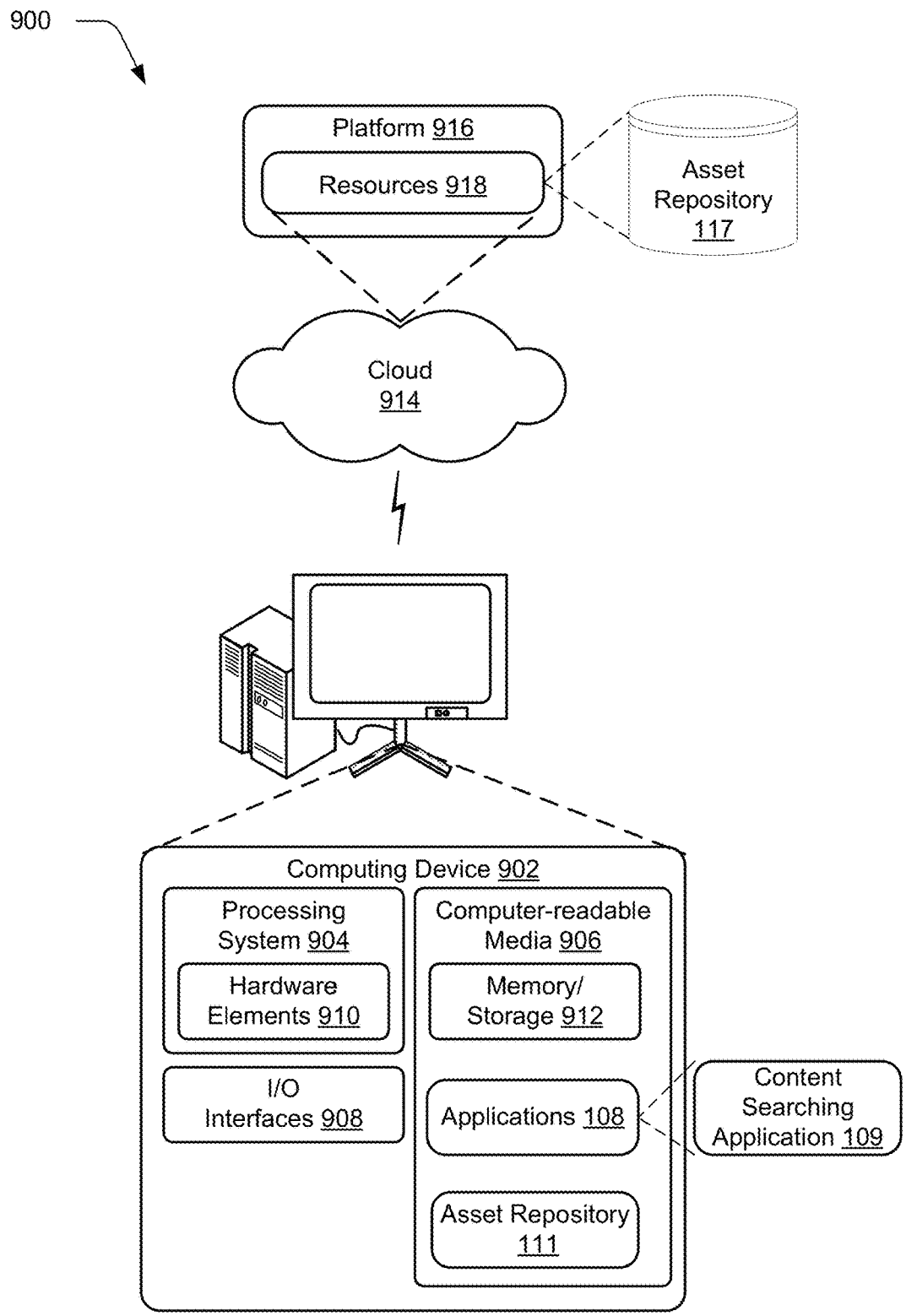
FIG. 9 illustrates an example system including various components of an example device that can be employed for one or more search implementations described herein.

FIG. 9 illustrates an example system generally at 900 that includes an example computing device 902 that is representative of one or more computing systems and/or devices that may implement the various techniques described herein. This is illustrated through inclusion of applications 108 including the content searching application 109, which operates as described above. The computing device 902 may be, for example, a server of a service provider, a device associated with a client (e.g., a client device), an on-chip system, and/or any other suitable computing device or computing system.

The example computing device 902 is illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device implementation, functionality described herein may be distributed throughout the system 900. For example, the functionality may be implemented in part on the computing device 902 as well as via the platform 916 that abstracts the functionality of the cloud 914.

CONCLUSION

Various implementations enable a similarity search to be conducted for assets based upon one or more assets being dragged from a viewing area and dropped into a search field. Search results are returned in the form of assets and textual representations that define search parameters. The textual representations can be easily modified to change the search parameters and, hence, the displayed search results.

In one or more implementations, when one or more assets are dropped into a search field, a search engine processes metadata associated with the asset(s) to formulate keywords that can be used to search for similar assets. Furthermore, in at least some implementations, the search engine can perform image analysis on an asset to then formulate a search strategy.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented in a digital medium environment including a computing device having a processor and a content searching application that includes a user interface to enable content searching to be conducted, the method comprising:
   performing, by the content searching application, image processing to pre-index assets for searching;
   detecting, by the content searching application, that an initial asset of the assets having content is received by a search field;
   performing, by the content searching application, an image analysis on the initial asset and developing metadata associated with the initial asset;
   conducting, by the content searching application, a similarity search associated with the initial asset by using the metadata to formulate at least one keyword to conduct the similarity search to search for one or more additional assets having metadata associated with the at least one keyword;
   displaying, by the content searching application, returned search results including the one or more additional assets and one or more tags in a tag bar of the user interface, the one or more tags representing the metadata of the one or more additional assets;
   detecting, by the content searching application, that an additional asset having content is received by the search field and that at least one of the one or more tags is manipulated to modify search parameters;

returning, by the content searching application, updated assets by weighting metadata associated with the additional asset more heavily so that the updated assets refine the search results to be more similar to the additional asset; and displaying, by the content searching application, the updated assets by removing assets from the updated assets that share metadata.

2. The method as described in claim 1, wherein the one or more additional assets include one or more of a video, an image, or text.

3. The method as described in claim 1, wherein the detecting that the initial asset having content is received by the search field comprises receiving a touch selection.

4. The method as described in claim 1, wherein the at least one of the one or more tags is manipulated by a deletion of the at least one tag.

5. The method as described in claim 1, wherein detecting that the initial asset having content is received by the search field includes recognizing a gestural input via the user interface.

6. The method as described in claim 1, wherein displaying the returned search results includes displaying a textual representation of the at least one keyword.

7. The method as described in claim 1, further comprising removing assets from the updated assets that have a particular tag of the one or more tags.

8. In a digital medium environment in which a computing device is configurable to use a content searching application that includes a user interface to enable content searching to be conducted, one or more computer-readable storage media comprising instructions that are stored thereon that, responsive to execution by the computing device, perform operations comprising:

performing image processing to pre-index assets for searching;

detecting that an initial asset of the assets having visual content has been received by a search field based at least partially on receiving a selection of the initial asset by recognizing a gestural input via the user interface;

performing an image analysis on the initial asset and developing metadata associated with the initial asset;

conducting a similarity search associated with the initial asset based on the metadata associated with the initial asset by using the metadata to formulate at least one keyword to conduct the similarity search to search for one or more additional assets that have metadata that is associated with the at least one keyword;

displaying returned search results including the one or more additional assets and a textual representation of the at least one keyword;

detecting that an additional asset having visual content has been received by the search field and that the textual representation of the at least one keyword has been modified to change search parameters;

returning updated assets by weighting metadata associated with the additional asset more heavily so that the updated assets refine the search results to be more similar to the additional asset; and displaying the updated assets by removing assets from the updated assets that share metadata.

9. The one or more computer-readable storage media as described in claim 8, wherein the one or more additional assets include one or more of a video, an image, or text.

10. The one or more computer-readable storage media as described in claim 8, wherein displaying the returned search results comprises displaying the returned search results in a content display area including a tag bar.

11. The one or more computer-readable storage media as described in claim 10, wherein the tag bar includes at least one tag representing the metadata of the one or more additional assets.

12. The one or more computer-readable storage media as described in claim 8, wherein the gestural input includes a touch selection.

13. The one or more computer-readable storage media as described in claim 8, the operations further comprising removing assets from the updated assets that have a particular tag.

14. The one or more computer-readable storage media as described in claim 8, wherein the one or more additional assets include at least one image having text.

15. A system implemented in a digital medium environment including a computing device having a content searching application that includes a user interface to enable content searching to be conducted, the system comprising:

a processor;

one or more computer readable media storing instructions executable via the processor to perform operations comprising:

performing, via the content searching application, image processing to pre-index assets for searching;

detecting, via the content searching application, that an initial asset of the assets having visual content has been dropped into a search field;

performing, via the content searching application, an image analysis on the initial asset and developing metadata associated with the initial asset;

conducting, via the content searching application, a similarity search associated with the initial asset by using the metadata to formulate at least one keyword to conduct the similarity search to search for one or more additional assets that have metadata that is associated with the at least one keyword;

displaying, via the user interface, search results including the one or more additional assets and a textual representation of the at least one keyword;

detecting, via the content searching application, that an additional asset having visual content has been dropped into the search field and that the textual representation of the at least one keyword has been modified to change search parameters;

returning, via the content searching application, updated assets by weighting metadata associated with the additional asset more heavily so that the updated assets refine the search results to be more similar to the additional asset; and displaying, via the content searching application, the updated assets by removing assets from the updated assets that share metadata.

16. The system as described in claim 15, wherein the detecting that the initial asset having the visual content has been dropped into the search field comprises receiving a touch selection.

17. The system as described in claim 15, wherein the one or more additional assets include one or more of a video, an image, or text.

18. The system as described in claim 15, wherein the one or more additional assets include at least one image having text.

19. The system as described in claim 15, wherein displaying the search results comprises displaying the search results in a content display area including a tag bar.

20. The system as described in claim 15, the operations further comprising removing assets from the updated assets that have a particular tag.

\* \* \* \* \*